United States Patent [19]
Freese

[11] 3,826,149
[45] July 30, 1974

[54] SEMI-AUTOMATIC HYDRAULIC CHAIN ADJUSTER

[75] Inventor: Gary P. Freese, Joliet, Ill.

[73] Assignee: Caterpillar Tractor Co., Peoria, Ill.

[22] Filed: Dec. 23, 1971

[21] Appl. No.: 211,320

[52] U.S. Cl. ...... 74/242.8, 74/242.1 A, 74/242.1 FP
[51] Int. Cl. ............................................ F16h 7/12
[58] Field of Search ......... 74/242.14, 242.11, 227, 74/242.9, 242.1, 242.1 FP; 305/10

[56] References Cited
UNITED STATES PATENTS 3,082,043  3/1963  Orton ............................... 305/10
3,101,977  8/1963  Hyler ............................... 305/10
3,310,127  3/1967  Siber ............................. 305/10 X
3,581,588  6/1971  Eftefield ..................... 74/242.14 R

FOREIGN PATENTS OR APPLICATIONS 1,204,046  1/1960  France ............................ 91/374

*Primary Examiner*—Samuel Scott
*Assistant Examiner*—Allan Russell Burke
*Attorney, Agent, or Firm*—Phillips, Moore, Weissenberger Lempio & Strabala

[57] ABSTRACT

A system for adjusting an endless belt or chain is provided which either automatically or semiautomatically adjusts belt tension.

6 Claims, 7 Drawing Figures

PATENTED JUL30 1974 3,826,149

INVENTORS
GARY P. FREESE

BY
Fryer, Tjensvold, Feix, Phillips & Lempio
ATTORNEYS

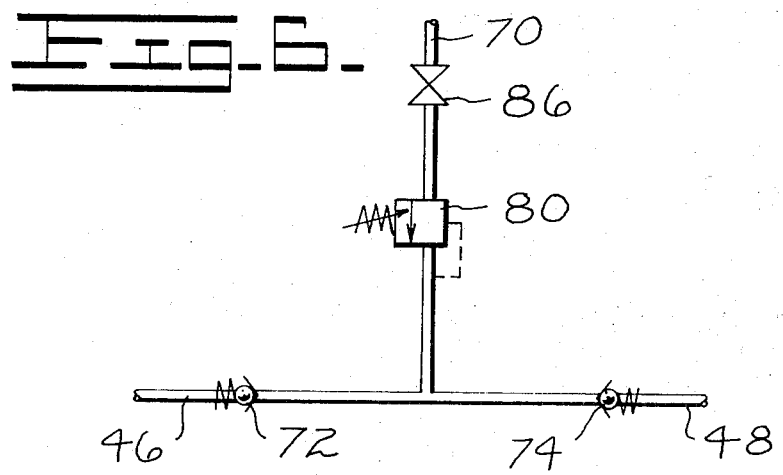
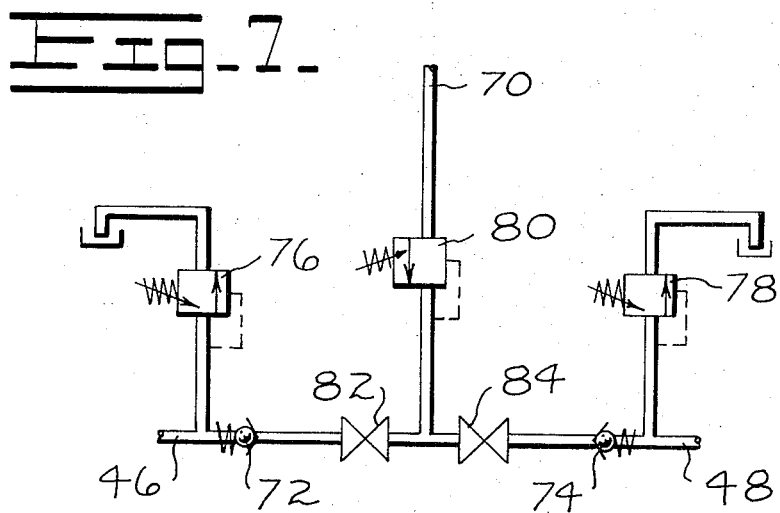

SEMI-AUTOMATIC HYDRAULIC CHAIN ADJUSTER

BACKGROUND OF THE INVENTION

This invention relates to a belt-adjusting mechanism which either automatically or semiautomatically provides and maintains proper belt tension. More particularly, the invention relates to a hydraulic, endless chain adjuster for an elevator such as found on an elevating scraper in the earthmoving industry. More particularly still, this invention relates to means for directing pressure fluid through appropriate valve means to adjust the distance between a pair of chain sprockets, and thereby the tension in the chain.

While the following disclosure relates to an endless chain adjuster for an elevator, it is to be understood that such is by way of example only. It is contemplated that such an adjusting mechanism may be advantageously employed wherever endless belts or loops such as chains, tracks, etc., are located about each of two or more wheels, pulleys, or the like. For example, track-type tractors, also in the earthmoving industry, typically utilize some sort of endless track adjusting mechanism. For examples of this type of application, reference may be had to U.S. Pat. No. 3,082,043 to Orton and to U.S. Pat. No. 3,645,586, (Application Ser. No. 53,177, filed July 8, 1970) to Peipho, the latter patent being assigned to Applicant's assignee.

It should be further understood that the term "belt" is used in its generic sense in the following disclosure and includes belts such as V-belts, chains, and tracks, etc. Accordingly, the terms are used interchangeably.

The problem of maintaining proper chain tension has been a long-standing one. The problem includes the avoidance of excessive tension in the chain which, because of its tightness over sprockets, generates friction between the moving elements and results in a consequent excessive amount of horsepower being required to motivate the chain. This unwanted tightness also result in excessive wear and consequent costly replacement.

The other side of the problem is the avoidance of too little tension in the chain which results in unwanted sag or deflection. One consequence of under tensioning the chain is that the chain may be broken as the chain slack is suddenly taken up. Excessive slack may also result in one of the pairs of chains of a scraper elevator being a link or two out of phase with the other of the pairs such that one end of the material-carrying flights is advanced ahead of the other which may result in breaking of the chain.

Prior art chain adjusters which have addressed themselves to these problems have tended to require excessive amounts of down time and labor. In view of the frequency with which adjustment is needed, this is a very expensive proposition. In addition, these prior art approaches require other special tools extraneous to the machine for manual adjustment of the chains.

It is to a solution to these and other problems that this invention is directed.

OBJECTS OF THE INVENTION

It is, therefore, an object of this invention to provide an improved chain adjusting mechanism. It is also an object of this invention to provide a chain adjusting mechanism which does not require the use of extraneous tools, but rather is integral with the vehicle on which the chain is mounted.

It is another object of this invention to provide a hydraulic chain adjusting mechanism for both automatically and semiautomatically tensioning the chain which uses a plurality of hydraulic cylinders which, in turn, utilize and are powered by a vehicle fluid power system.

It is a still further object of this invention to provide an automatic hydraulic chain adjusting system which both provides and maintains proper chain tension to preset requirements such that desired chain deflection is achieved.

Other and further objects and advantages of the present invention will become apparent from the following description and claims and as illustrated in the accompanying drawings which, by way of illustration only, show preferred embodiments of the present invention and principles of operation thereof, and what are now considered to be the best modes contemplated for applying these principles. Other embodiments of the invention embodying the same or equivalent principles may be used and structural changes may be made as desired by those skilled in the art without departing from the present invention and the scope of the appended claims.

BRIEF DESCRIPTION OF THE DRAWINGS

FIGS. 3–7 are respectively alternate embodiments of the hydraulic circuitry shown in FIG. 2.

DETAILED DESCRIPTION

Figure 1:
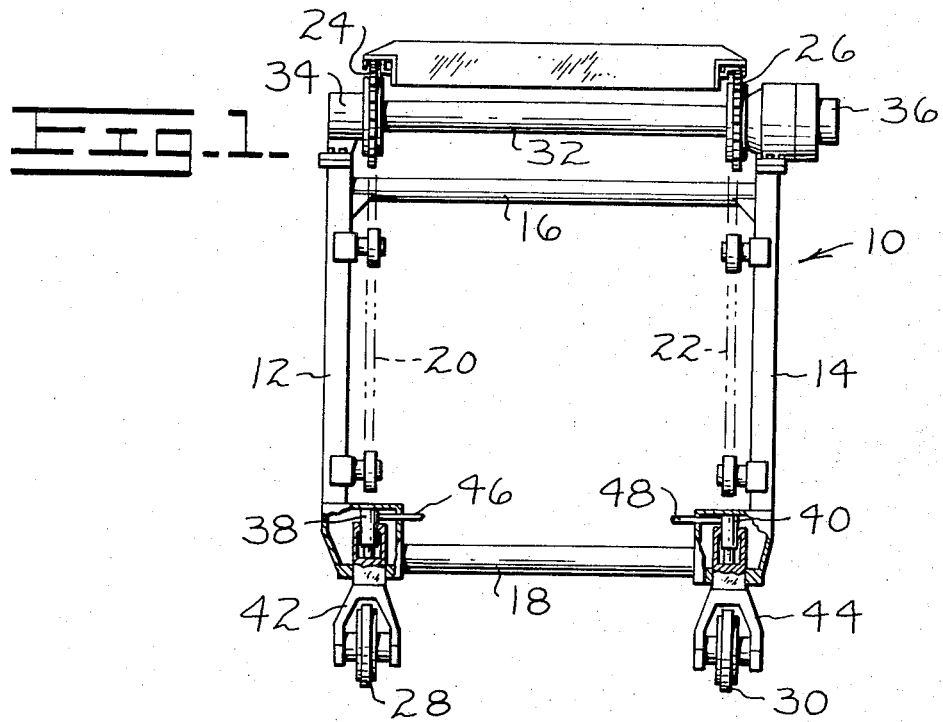
FIG. 1 is a front elevational view, partially cut away, of an elevator assembly for an elevating scraper which may advantageously use the instant invention.

Referring now to FIG. 1, there is shown generally at 10 an elevator assembly for an elevating scraper. The elevator assembly comprises a pair of spaced, parallel, vertical frame members 12, 14, joined at their extremities by a pair of parallel, transversely extending frame members 16, 18, so as to form a rigid, box-like supporting structure. The pair of endless chains shown in phantom line at 20, 22, pass about a pair of drive sprockets 24, 26, and idlers 28, 30, respectively. The drive sprockets are suitably mounted on opposite ends of drive shaft 32, one end of which is journalled in a conventional bearing block 34. The other end of drive shaft 32 is conventionally attached to the output of motor means 36.

Adjustment of chain tension is achieved by means of a pair of hydraulic cylinders 38, 40, which, in turn, motivate yoke members 42, 44, rotatably supporting idler wheels 28, 30, respectively, in a direction away from the linearly fixed drive sprockets. Obviously, extension and retraction of the yoke members 42, 44, with respect to drive sprockets 24, 26, will correspondingly result in an increase or decrease in tension in chains 20, 22. Fluid for effectuating the movement of the yokes is communicated by way of hydraulic lines 46, 48, from a hydraulic circuit as hereinafter described.

Figure 2:
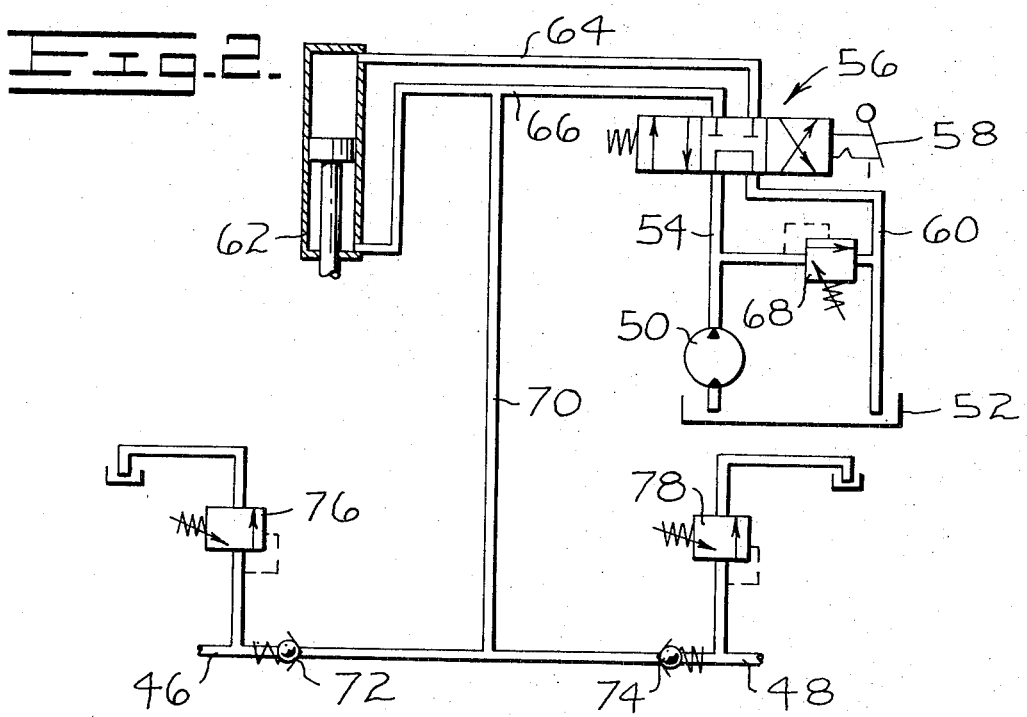
FIG. 2 is a schematic diagram of the hydraulic circuit of the preferred embodiment of the invention.

FIG. 2 shows the preferred embodiment of the hydraulic circuit for effectuating the desired tension adjustment in the elevator assembly of FIG. 1. Lines 48, 46 are understood to be identical with their numerical counterparts in The subject figures. Pressure fluid for actuation of the hydraulic cylinders can be provided from any one of a number of implement hydraulic circuits which are commonly found on elevating scrapers, e.g., elevator drive, bowl lift, steering, or ejector circuits. Fig. 2 shows an ejector circuit which is comprised of a pump 50 which draws fluid from a hydraulic fluid reservoir 52. Pressure fluid is communicated by way of line 54 to the ejector control valve generally shown at 56. The valve is manually actuated by means of lever 58.

When the valve is in the neutral position shown, fluid from conduit 54 is returned to the reservoir by way of line 60. Actuation of control valve 56 by the operator selectively directs fluid to either the head end or rod end of double acting ejector cylinder 62 by way of lines 64 or 66 in the conventional manner. An adjustable pressure relief valve 68 is provided across lines 54, 60, in order to protect the circuit from overpressure conditions. Line 70 intercommunicates line 66 with the chain tensioning hydraulic cylinders by way of left and right branch lines 46, 48. A pair of check valves 72, 74 in lines 46, 48, respectively, prevent the reverse flow of fluid through these lines to line 70 as well as to the opposite one of the pair of chain tensioning cylinders from the cylinder in which the pressure surge is developed, causing the reverse flow; e.g., by striking a foreign object.

Adjustable relief valves 76, 78 may be present to protect the cylinders against high pressure surges due to external forces acting on the idler wheels. Adjustment of chain tension is accomplished as follows. The operator manually moves lever 58 so as to direct pressure fluid to ejector cylinder 62. Ejector cylinder 62 is a double-acting hydraulic cylinder such as found on an elevating scraper. If desired, reference may be had to U.S. Pat. No. 3,581,415 to Larson et al., issued June 1, 1971, assigned to the same assignee for a full description of the structure and operation of such an ejector cylinder shown at 136 and described at column 8 thereof. When the ejector has reached its limit of travel and when the ejector cylinder piston bottoms out or comes to rest, pressure builds up in cylinder 62, which pressure is vented by means of adjustable relief valve 68. The pressure setting of relief valve 68 also determines the pressure in cylinders 38, 40 (FIG. 1), by way of lines 46, 48, 70, etc., and thereby the tension in the chain. In other words, as the rod moves into cylinder 62, the fluid that has been directed to the cylinders 38, 40 remains therein under pressure due to the one way check valves 72, 74 to thereby maintain tension in the endless belt. It is to be pointed out however, that while the description has been focused on the ejector cylinder, other double acting cylinders found on a scraper vehicle can be utilized if so desired. This determination of the pressure in cylinders 38, 40, by the presetting of valve 68 is thus seen to be automatic. Once the elevator chains have been thus adjusted, valve 58 is shifted to the retract position to retract the ejector for subsequent operation of the scraper elevator in the conventional manner.

The relief valves 76, 78, which protect the cylinders against external loads could be designed for cylinder maximum pressure in the alternative, with no adjustment feature. Also, if the cylinders were of sufficient size and strength to withstand all external loading encountered in the scraper environment, relief valves like 76, 78, would not be required.

Figure 3:
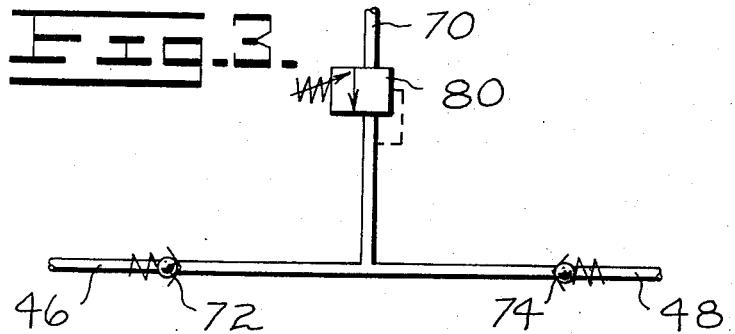

The second embodiment shown in FIG. 3 shows just such a system wherein the subject relief valves are eliminated. This embodiment differs from that shown in FIG. 2 by the addition of a pressure-reducing valve 80 in line 70. Pressure-reducing valve 80 is present to communicate fluid to the cylinders under pressure sufficient to adjust the chain to a desired deflection or sag. The pressure setting of valve 80 automatically determines the pressure in the cylinders and thus the tension in the chain.

Figure 4:
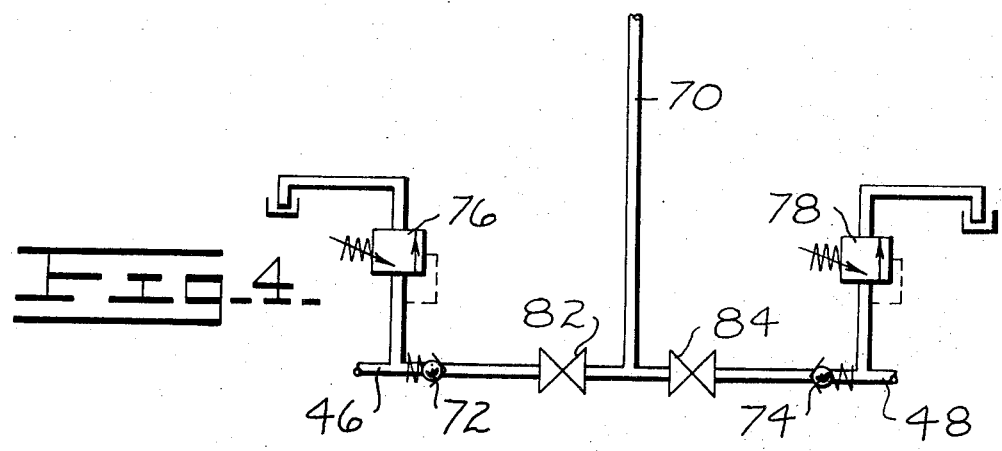

The third embodiment shown in FIG. 4 corresponds to that shown in FIG. 2 with the addition of a manual on-off control valve 82, 84 in each of lines 46, 48, respectively. These manual control valves are provided so as to isolate the cylinder from the adjuster circuit whereby servicing of only one of the cylinders would be possible.

Figure 5:
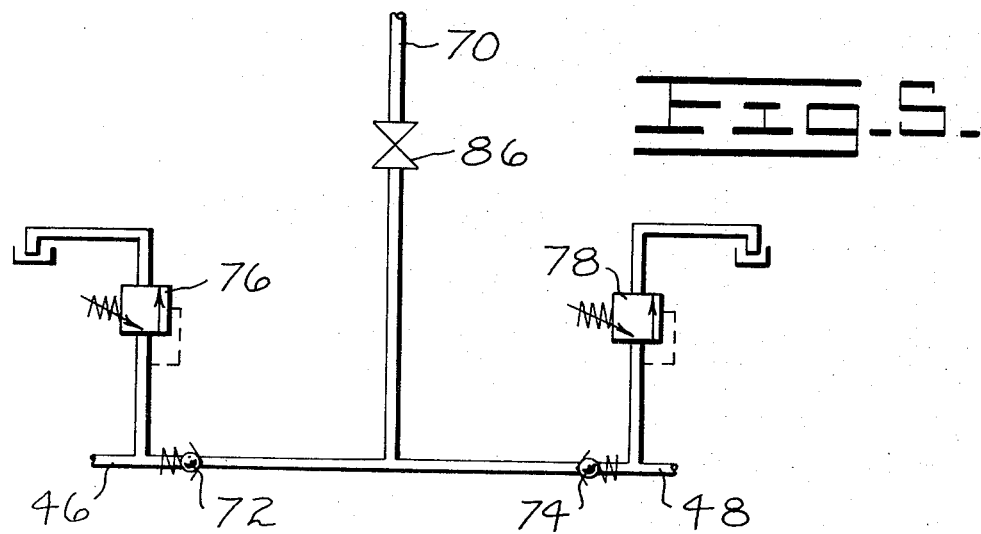

The fourth embodiment shown in FIG. 5 corresponds to that shown in FIG. 2 with the additional of a manual control valve 86 in line 70 to simultaneously isolate both of the cylinders. Manual control valve 86, in like manner to the manual control valves of the aforesaid embodiment, could be located at the operator station whereby the operator would not have to leave his work station for semiautomatic operation of the chain adjuster mechanism. With this embodiment the operator has the alternative of either automatic or semiautomatic operation depending upon whether valve 86 is normally open or closed.

The fifth embodiment of FIG. 6 corresponds generally with the second embodiment of FIG. 3 with the addition of the manual control valve 86 in line 70 ahead of pressure reducing valve 80. When valve 86 is fully opened, automatic operation is provided as described in the embodiment of FIG. 3. Semiautomatic operation is provided by keeping the valve fully closed except when adjusting is desired.

The sixth and last embodiment shown in FIG. 7 corresponds generally to that shown in the third embodiment of FIG. 4 with the addition of pressure-reducing valve 80 in line 70. Again, both automatic and semiautomatic operations are thus possible.

While I have illustrated and described the preferred embodiments of my invention, it is to be understood that these are capable of variation and modification, and I, therefore, do not wish to be limited to the concise details set forth, but desire to avail myself of such changes and alternations as fall within the purview of the following claims.

I claim:

1. An adjusting mechanism for a machine having an idler wheel and a drive wheel, an endless belt entrained over said wheels, said mechanism comprising:
a pressure fluid source,
control valve means for selectively communicating said fluid source with
opposite ends of a double acting hydraulic cylinder, said double acting cylinder having a movable piston therein and a rod extending therefrom, and being movable into and out of said double acting cylinder,
hydraulic cylinder means, said hydraulic cylinder means motivating the idler wheel with respect to the drive wheel so as to adjust the tension of the endless belt, first relief valve means for limiting the magnitude of fluid pressure communicated to said hydraulic cylinder means, second relief valve means for protecting said hydraulic cylinder means from pressure surges caused by external forces transmitted thereto from said idler wheel means, and further including check valve means intermediate said control valve means and said hydraulic cylinder means, said check valve means preventing fluid flow to said control valve means from said hydraulic cylinder means, when said rod has moved out of said double acting cylinder to thereby keep said endless belt in tension while permitting fluid flow from said control valve means to said hydraulic cylinder means, whereby said endless belt will be tensioned upon each occurence of said rod moving substantially completely out of said double acting cylinder, and before commencing its return movement.

2. The invention of claim 1 further including third valve means intermediate said first relief valve means and said hydraulic cylinder means, said third valve means operable to selectively close off communication between said first relief valve means and said hydraulic cylinder means whereby automatic tensioning of said belt is precluded and semiautomatic tensioning is provided.

3. The invention of claim 1 wherein said second relief valve means is intermediate said fluid source and said control valve means for protecting the system from overpressure conditions.

4. The invention of claim 2 wherein a plurality of said mechanisms are provided and wherein a third valve means is provided corresponding to each hydraulic cylinder means, each of said third valve means being separately operable whereby selective adjustment of each hydraulic cylinder means is provided.

5. The invention of claim 1 wherein said second relief valve means is intermediate said fluid source and said control valve means for protecting the system from overpressure conditions, and wherein said check valve means is intermediate said control valve means and said hydraulic cylinder means, said check valve means preventing fluid flow to said control valve means from said hydraulic cylinder means and permitting fluid flow from said control valve means to said hydraulic cylinder means.

6. The invention of claim 5 further including third valve means intermediate said fluid source and said second relief valve means, said third valve means operable to selectively close off communication between said fluid source and said second relief valve means whereby automatic tensioning of said belt is precluded and semiautomatic tensioning is provided.

* * * * *